Aug. 20, 1935.  E. LORIUS  2,012,085
ARTIFICIAL FLOWER
Filed July 28, 1934   2 Sheets-Sheet 2
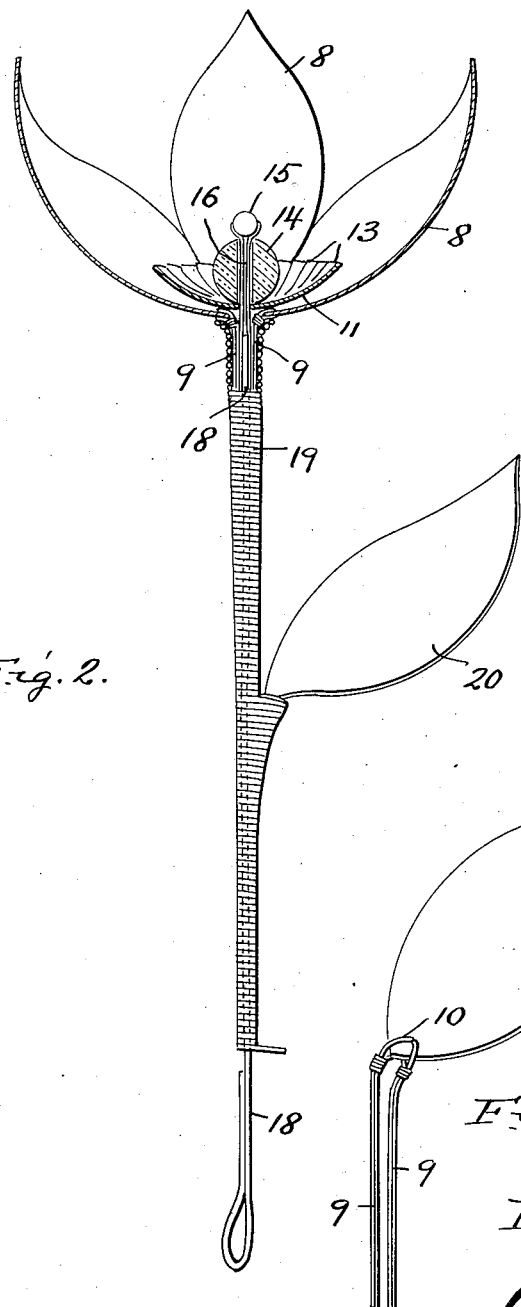
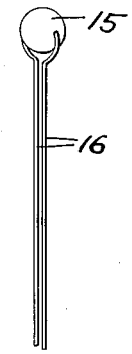
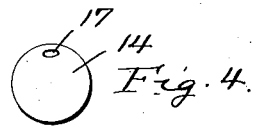
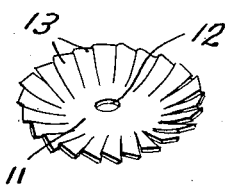
Inventor
Emile Lorius
By Clarence A. O'Brien
Attorney Patented Aug. 20, 1935

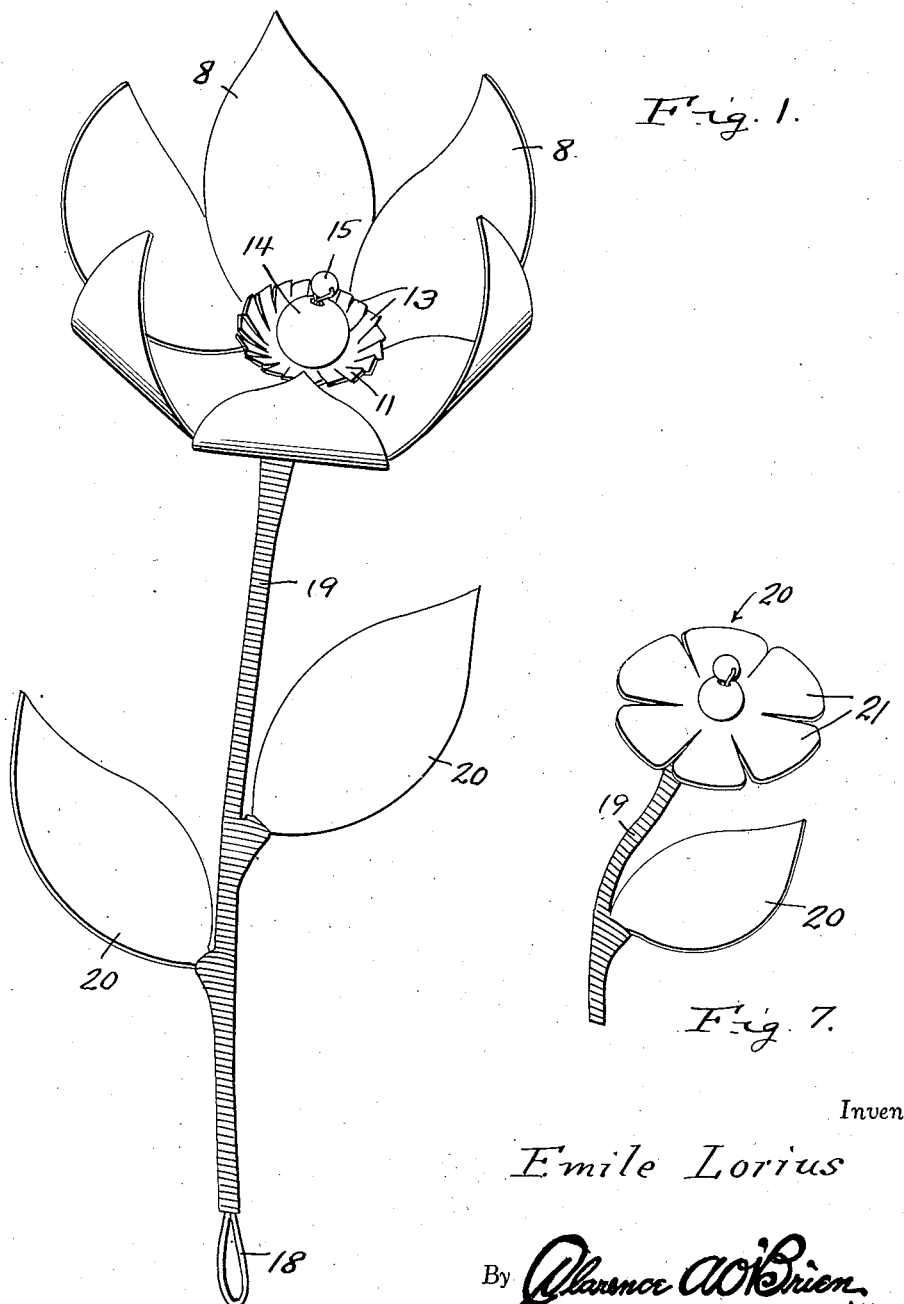

2,012,085

UNITED STATES PATENT OFFICE 2,012,085

ARTIFICIAL FLOWER

Emile Lorius, Alliance, Ohio, assignor to Olga Erma Nelson, Chicago, Ill.

Application July 28, 1934, Serial No. 737,437

2 Claims. (Cl. 41—13)

This invention relates to that line of endeavor which embraces the construction and formation of so-called artificial flowers, essentially of the metallic type.

More explicitly, the invention has to do with the manufacturing and assembling of the several or individual parts of a flower out of sheet metal, ornamental beads, tie and assembling wires, and a suitable wrapping for said wires which wrapping cooperates with the wires in defining a bendable stem, as well as the branches carrying leaves attached to said stem.

In order to develop and construct an artificial flower assemblage whose features will transcend those of corresponding features in similar prior art devices, I have resorted to the adoption and use of readily available material susceptible of being converted in requisite shape, so that the parts can be coordinated and allocated to provide the desired realistic and ornamental effects.

Other features and advantages will become more readily apparent from the following description and drawings.

In the drawings:

Figure 1 is a perspective view of one style or embodiment of artificial flower constructed in accordance with the invention.

Figure 2 is a view similar to Figure 1 with portions shown in section and elevation to illustrate the assemblage of parts a little more in detail.

Figures 3, 4, 5, and 6 are perspective details of the accessories or parts used in the make up of the composite flower.

Figure 7 is merely a perspective view of a slightly different form or embodiment of the invention.

Referring now to the drawings by distinguishing reference numerals, it will be observed in Figures 1 to 6 inclusive that the petals which go to make up the cup-like flower are indicated by the numerals 8. These are naturally formed of sheet metal of appropriate pliability which can be bent into shape and cut into proper outline. In practice, the petals are painted or tinted to promote the requisite artistic as well as realistic effects. A pair of complemental or companion wires 9 are attached to the inner pointed ends of the petals by looping the wires through a hole as indicated at 10. This provides the means for assembling and holding the petals of the cup-like flower in nested relationship. In the arrangement shown in Figure 1 the assemblage of petals might well be designated as the calyx of the flower.

The next part to which I call attention is the slightly cupped metal disk 11 centrally apertured as at 12 and having its edge portions serrated to form scallops 13. This part is placed centrally in the main outer calyx and functions somewhat in the capacity of the corolla. The imitation pollen is here made up of a pair of complemental beads or ball-like elements. In the drawings, I have found it desirable to illustrate two glass beads, that is, a large centrally bored bead 14 and a small crowning bead 15. Attaching wires 16 are secured to the latter bead and extend down through the hole 17 in the main bead 14 as well as through the hole in the disk 11. Then all of the wires, that is, the wires 16 and 9 are attached to a primary relatively sturdy wire 18 by soldering or the like so as to keep the parts assembled. Finally, a green cord or the like 19 is wrapped around this assemblage or wires allowing the wire to serve as a core and the string as a sheet making up the composite artificial stem of the flower. In practice, the leaves 20 are made the same as the petals 8 and are fastened in place by similar wires 9.

In Figure 7 the same idea is carried into effect, the exception being that the flower per se is distinguished by the numeral 20, being of disk-like form and the petals thereof being indicated at 21. Otherwise, the parts which are here shown correspond with similar parts already described and this makes up the complete composite flower.

Considering the forms of the invention generically, it will be observed that novelty is predicated upon the use of a plurality of companion parts, such as, for instance, the petals 8, disk 11, and beads 14 and 15, which parts are provided with complemental wires all brought together in close relationship and encased within the sheet forming cord or wrapper 19. In selecting and developing these features, it is evident that we have remained in keeping with simplicity, durability and efficiency in construction. It follows, therefore, that the manufacturer of a flower of this type is able to produce them in large quantity lots expeditiously and economically. Then too, the final finished product is something which is sufficiently artistic and ornate and in fact realistic enough to insure endorsement by the trade in general. It is evident beyond doubt, therefore, that this is a specific innovation and development in this line of endeavor and fulfills the prerequisites of a satisfactory article of trade.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

What is claimed is:

1. An artificial flower comprising a plurality of substantially duplicate artificial metal petals, said petals being joined together and provided with assembling and attaching wires, said wires being brought into close mechanical relationship and forming the core of an artificial stem, the remainder of said stem being defined by a cord wrapping surrounding the wires, a cupped metal disk arranged centrally in the assemblage of petals, said disk having its edge portion serrated and the central portion apertured, a bead of ball-like form seated in said disk and having a bore in alinement with said wrapping, and a relatively smaller bead arranged on top of said first-named bead and provided with wires extending through said bore and through the aperture in said disk and down into said wrapping.

2. An artificial flower of the class described comprising a flower proper embodying a plurality of companion artificial petals, said petals being constructed of bendable metal susceptible of being cut and formed into requisite shapes to define the calyx portion of the flower, independent assembling and retaining wires connected with corresponding end portions of said petals, said wires being brought into close mechanical relationship and serving to define a portion of the core of an artificial flexible stem, a cupped metal disk arranged centrally with respect to the assembly of petals, said disk having its edge serrated and its central portion apertured, said disk cooperating with the petals in defining the corolla, a ball-like element arranged in the central portion of said cupped disk to cooperate therewith in defining the pollen, a retaining wire passing through the bore in said ball-like element, said wire being associated with said first named wire, and a cord wrapping surrounding the wires and cooperating therewith in completing the stem structure.

EMILE LORIUS.